Patented May 11, 1926.

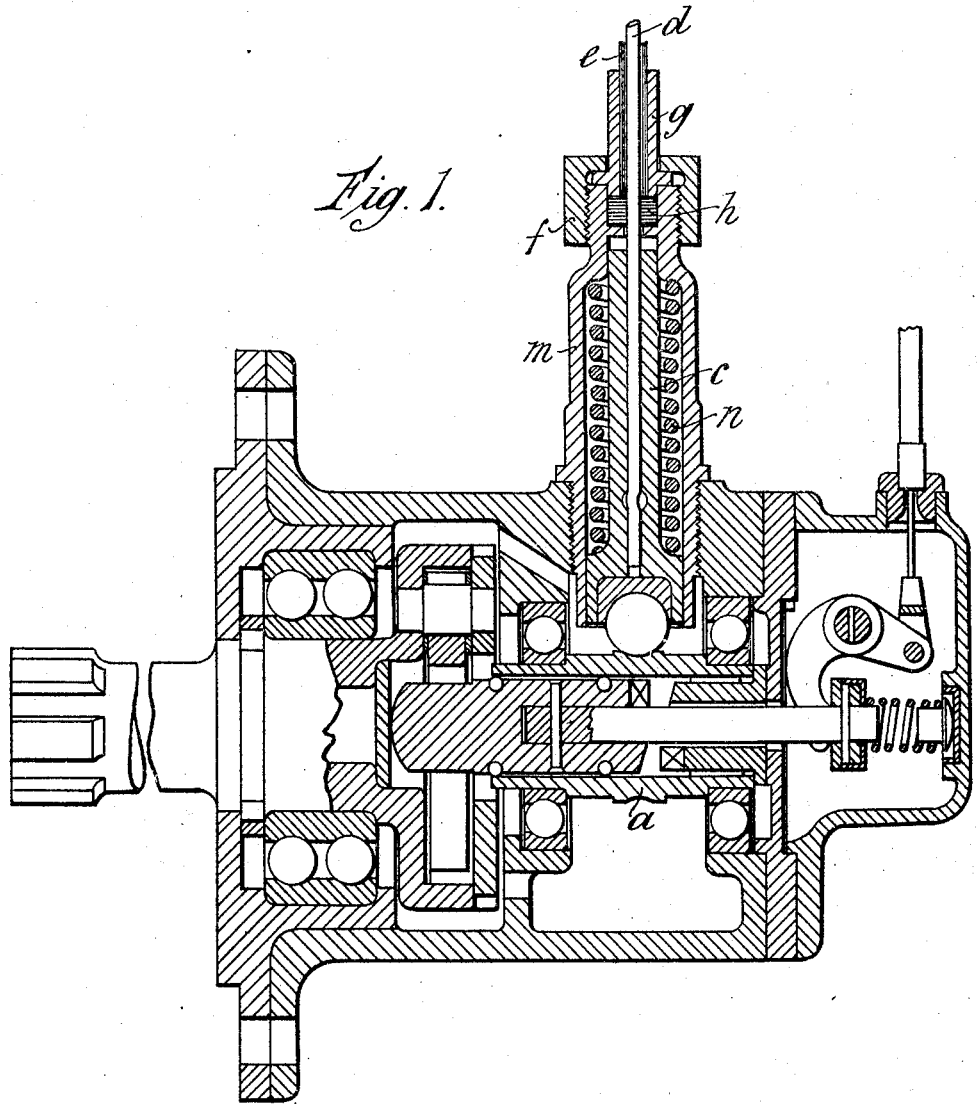

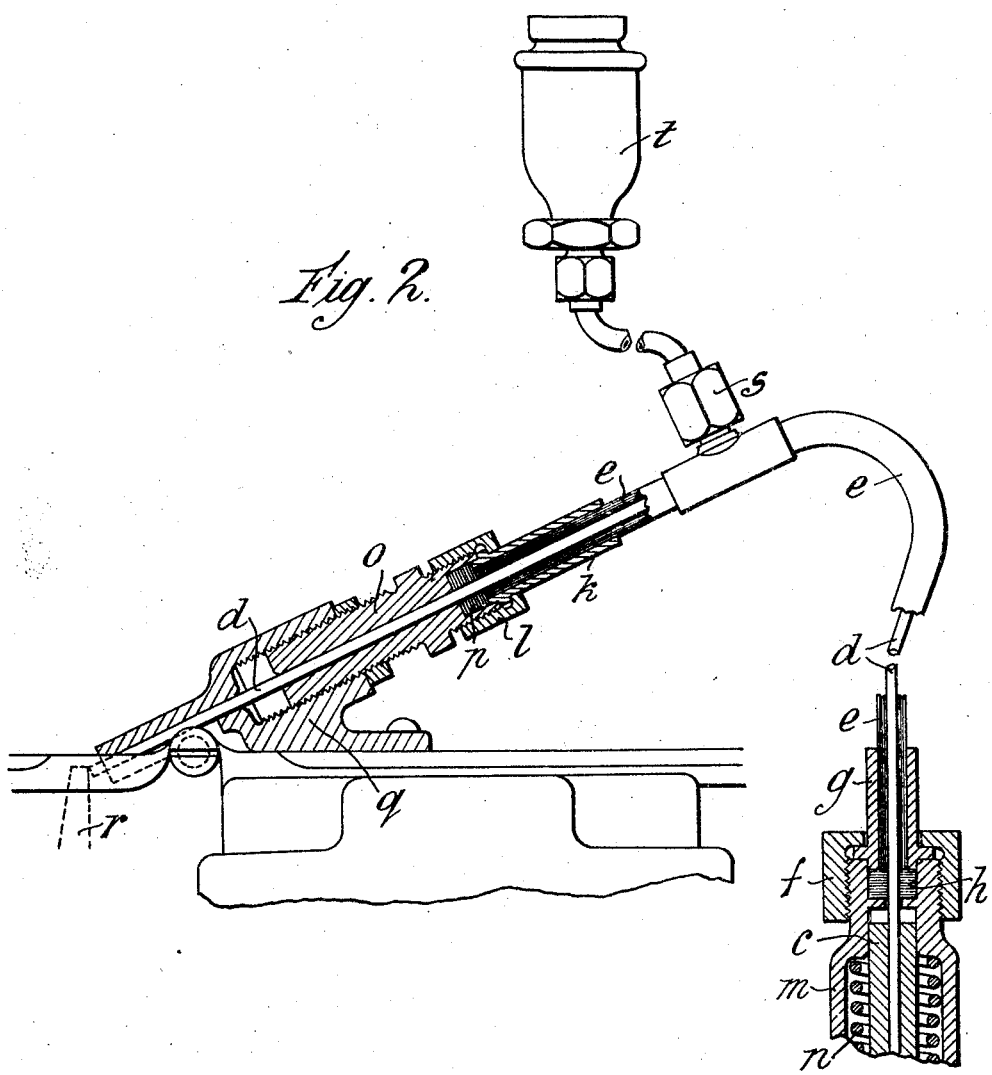

1,584,435

UNITED STATES PATENT OFFICE.

GEORGE CONSTANTINESCO, OF WEYBRIDGE, ENGLAND.

MECHANISM FOR TRANSMITTING IMPULSES TO A DISTANCE, SPECIALLY APPLICABLE FOR ACTUATING GUN TRIGGERS.

Original application filed March 28, 1925, Serial No. 19,116. Divided and this application filed December 7, 1925. Serial No. 73,894.

The present invention relates to means for transmitting impulses over short distances and is particularly applicable to synchronizing devices where blows have to be struck at a moderate distance from the apparatus by which the impulse is generated at definite intervals of time which may be extremely small. It is particularly applicable to synchronizing devices whereby a machine gun, mounted on an aeroplane, is fired at definite intervals variable in accordance with the propeller speed so that the bullets pass between the blades.

The invention comprises a tube of brass or other metal having within it a wire urged by a spring in one direction only and adapted to transmit the impulses by pressure. The opposite end of the wire is free and is not attached to any fitting. The space between the wire and the tube is maintained full of a mixture of paraffin and oil or other non-freezing lubricating liquid through a branch in the tube, suitable stuffing boxes being provided at the two ends of the tube so that air is completely excluded.

The invention also consists in utilizing in connection with such apparatus a device for automatically advancing or retarding the blow struck in accordance with the speed as described in my specification Serial No. 19,116, of which application the present application is a division.

Referring to the accompanying drawings—

Figure 1 shows my invention applied to the device described in my specification Serial No. 19,116 for synchronizing the discharge of a machine gun with an aeroplane propeller. The figure shows a section of this device, but this does not call for special description.

Figure 2 shows the mode by which the trigger of a machine gun is actuated and the means for introducing lubricant. Part only of the device is shown, the remainder being shown in Figure 1.

A steel wire $d$ of about 3 mm. in diameter slides in a stout tube $e$ preferably of brass, which can be bent as desired so as to accommodate it to different positions. The end of the tube is fastened into a connection $g$ which is secured by a screw cap $f$ to the casing $m$. The connection $g$ forms the gland of a stuffing box $h$. The stuffing box with the assistance of a lubricant excludes air from the tube, as will be described hereinafter. The end of the wire is fastened into a socket $c$. The lower end of the socket is formed into a bearing for a ball which in the present instance rests on the rotating cam $a$ of the synchronizing device, as described in my former specification above mentioned, but any suitable means of conveying motion to the socket may be used. The ball is held in contact with the cam by a spring $n$. The opposite end of the tube (Figure 2) passes through a gland or connection $k$ similar to $g$ which is secured by a screw cap $l$ to a nozzle $o$, the nozzle being provided with a stuffing box $p$ similar to $h$. This nozzle is adjustably screwed into a support $q$ on the gun or other machine which it is desired to actuate, and the support is bored to receive the wire near its end, the wire protruding so as to reach the trigger or sear $r$. In this arrangement the inertia of the parts operating the trigger is practically limited to that of the wire, and a length of 10 feet or more of wire may be used.

An important feature of the invention is the freedom of the end of the wire remote from the end which is struck. The apparatus is adapted for the delivery of high-frequency impulses, and any fittings attached to the wire increase the inertia of the mass moved and interfere with the rapidity of action. Moreover, such fittings tend to become detached by their own inertia. There are several other advantages, for instance, the wire can be cut to any desired length to suit the distance required, and the free tip can then be locally hardened by heat treatment so as to present a hard surface in order to resist the very high local stresses created during the impact. The whole portion of the wire which is encased could be left in a more malleable state so as to enable the pipe to be bent round corners. Under such conditions the wire can be pulled out of the pipe for inspection and reinserted with the greatest facility. This is an essential point, for instance, in firing gears for aeroplanes. The replacement of a broken wire is only a question of a few minutes if the gun end of the wire is free as it is in my invention.

It is found that when a device of this kind is used at high altitudes, unless the air is excluded, the moisture which enters with it freezes, with the result that the whole gear becomes frozen up or rusted in time. In order to exclude the air as well as to provide for lubrication, a branch *s* is provided at some suitable point of the tube *e* through which branch a mixture of paraffin and oil or some other non-freezing lubricant is introduced. The means for doing this may be of any kind. In the example shown the oil is introduced from a reservoir *t* at a higher level or from some other source and keeps the clearance space between the wire and the tube and other surrounding parts full of oil, supplying the place of any oil which may drip away at the ends of the wire. Owing to the clearance being slight and on account of the stuffing boxes, this drip is very slow. Air is excluded by this constant supply of oil.

What I claim is:—

1. Mechanism for conveying impulses to a distance by pressure on the end of a wire, comprising in combination a wire slidably enclosed in a metal tube, air excluding stuffing boxes at each end of the wire, spring pressed means engaging with the wire at one of its ends only, the other end being free and delivering the impulses, a branch on the metal tube for introducing non-freezing lubricant into the tube, and means for applying pressure to the spring pressed end of the wire.

2. In apparatus as claimed in claim 1, an oil reservoir situated above the said tube and means for conducting oil from the reservoir to the said branch.

In testimony that I claim the foregoing as my invention I have signed my name this 26th day of November, 1925.

GEORGE CONSTANTINESCO.